(12) United States Patent
Combs

(10) Patent No.: US 6,855,658 B1
(45) Date of Patent: Feb. 15, 2005

(54) HYDROXIDE CONTAINING DOUBLE METAL CYANIDE (DMC) CATALYSTS

(75) Inventor: George G. Combs, McMurray, PA (US)

(73) Assignee: Bayer Antwerp, N.V., Antwerp (BE)

( * ) Notice: Subject to any disclaimer, the term of this patent is extended or adjusted under 35 U.S.C. 154(b) by 0 days.

(21) Appl. No.: 10/649,520

(22) Filed: Aug. 26, 2003

(51) Int. Cl.[7] ............................................... B01J 27/26
(52) U.S. Cl. ........................ 502/175; 423/365; 423/367
(58) Field of Search ......................... 502/175; 423/365, 423/367

(56) References Cited

U.S. PATENT DOCUMENTS

| | | | |
|---|---|---|---|
| 3,404,109 A | 10/1968 | Milgrom | 260/611 |
| 3,829,505 A | 8/1974 | Herold | 260/611 B |
| 3,941,849 A | 3/1976 | Herold | 260/607 A |
| 4,477,589 A | 10/1984 | van der Hulst et al. | 502/169 |
| 5,158,922 A | 10/1992 | Hinney et al. | 502/175 |
| 5,470,813 A | 11/1995 | Le-Khac | 502/175 |
| 5,627,122 A | 5/1997 | Le-Khac et al. | 502/175 |
| 5,783,513 A | 7/1998 | Combs et al. | 502/175 |
| 5,952,261 A | 9/1999 | Combs | 502/175 |
| 6,303,533 B1 | 10/2001 | Grosch et al. | 502/175 |
| 6,303,833 B1 | 10/2001 | Grosch et al. | 568/613 |
| 6,362,126 B1 | 3/2002 | Grosch et al. | 502/154 |
| 2002/0006864 A1 | 1/2002 | Grosch et al. | 502/175 |
| 2002/0032121 A1 | 3/2002 | Grosch et al. | 502/175 |
| 2003/0013604 A1 | 1/2003 | Grosch et al. | 502/175 |

OTHER PUBLICATIONS

Inorganic Chemistry, 14, (8), (month unavailable) 1975, Kenneth M. Harmon and Irene Gennick, "Hydrogen Bonding. V. Possible Existence of Strongly Hydrogen–Bonded Water–Fluoride and Water–Hydroxide Complex Anions, (F $H_2O)_2^{2-}$ and HO $H_2O)_2^{2-}$, in Tetramethylammonium Ion Salt Hydrates[1,2]".

Journal of Catalysls 105, (month unavailable) 1987, pp. 163–174, J. Kuyper and F. Boxhoorn, "Hexacyanometallate Salts Used as Alkene–Oxide Polymerization Catalysts and Molecular Sieves".

*Primary Examiner*—Elizabeth D. Wood
(74) *Attorney, Agent, or Firm*—Joseph C. Gil; John E. Mrozinski, Jr.

(57) ABSTRACT

The present invention provides a crystalline, hydroxide containing double metal cyanide (DMC) catalyst of the formulae (I) or (II),

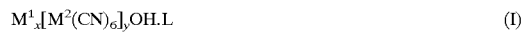

$M^1_x[M^2(CN)_6]_y \cdot OH \cdot L$      (I)

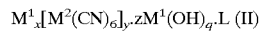

$M^1_x[M^2(CN)_6]_y \cdot zM^1(OH)_q \cdot L$      (II)

wherein $M^1$ represents a metal selected from $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$, $M^2$ represents a metal selected from $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$, L represents an organic ligand and x, y and q are chosen to maintain electroneutrality. Further provided are processes for the production of the inventive DMC catalysts. The crystalline, hydroxide containing DMC catalysts of the present invention may find use in the preparation of polyols, such as polyether polyols.

32 Claims, 2 Drawing Sheets

HYDROXIDE CONTAINING DOUBLE METAL CYANIDE (DMC) CATALYSTS

FIELD OF THE INVENTION

The present invention relates in general, to catalysis and catalysts, and more specifically, to a new class of crystalline, hydroxide containing DMC catalysts and polyols made therewith.

BACKGROUND OF THE INVENTION

Double metal cyanide (DMC) complexes are well known in the art for catalyzing epoxide polymerization. Double metal cyanide (DMC) catalysts for the polyaddition of alkylene oxides to starter compounds, which have active hydrogen atoms, are described, for example, in U.S. Pat. Nos. 3,404,109, 3,829,505, 3,941,849 and 5,158,922. These active catalysts yield polyether polyols that have low unsaturation compared to similar polyols made with basic (KOH) catalysis. The DMC catalysts can be used to make many polymer products, including polyether, polyester, and polyetherester polyols. The polyether polyols obtained with DMC catalysts can be processed to form high-grade polyurethanes (e.g., elastomers, foams, coatings and adhesives).

DMC catalysts are usually prepared by the reaction of an aqueous solution of a metal salt with an aqueous solution of a metal cyanide salt in the presence of an organic complexing ligand such as, for example, an ether. In a typical catalyst preparation, aqueous solutions of zinc chloride (in excess) and potassium hexacyanocobaltate are mixed, and dimethoxyethane (glyme) is subsequently added to the formed suspension. After filtration and washing of the catalyst with aqueous glyme solution, an active catalyst of formula:

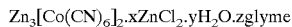

$Zn_3[Co(CN)_6]_2 \cdot xZnCl_2 \cdot yH_2O \cdot zglyme$ is obtained.

Substantially amorphous DMC catalysts having exceptional activity for polymerizing epoxides are described in U.S. Pat. No. 5,470,813. Compared with earlier DMC catalysts, the DMC catalysts described therein possess excellent activity and produce polyether polyols with very low unsaturation. The catalysts of the '813 patent are active enough to allow their use at very low concentrations, often low enough to overcome any need to remove the catalyst from the polyol.

U.S. Pat. No. 4,477,589, issued to van der Hulst et al., teaches an acid modified DMC catalyst prepared initially without organic complexing agent, by the addition of sodium hydroxide to precipitated zinc hexacyanocobaltate to form the intermediate hydroxide salt of the general formula:

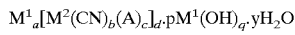

$M^1_a[M^2(CN)_b(A)_c]_d \cdot pM^1(OH)_q \cdot yH_2O$

This catalytically inactive intermediate is isolated and neutralized by HCl with and without glyme organic complexing agent. Ethers or glymes are the preferred organic activating agent. This patent further teaches the use of Zn and Co in the presence of glyme, HCl, and $ZnSO_4$.

Combs et al., in U.S. Pat. No. 5,783,513, teach a process for making substantially non-crystalline double metal cyanide (DMC) catalysts having improved activity and performance. The process involves using a metal salt having an alkalinity within the range of about 0.2 to about 2.0 wt. % as metal oxide based on the amount of metal salt to prepare the catalyst. This patent further teaches that important polyol properties such as viscosity and unsaturation improve when the alkalinity of the metal salt used to make the DMC catalyst is properly controlled. A hydroxyl ligand is taught by Combs et al.

U.S. Pat. No. 5,627,122, issued to Le-Khac et al., teaches a crystalline DMC complex catalyst containing a DMC compound, an organic complexing agent, and a metal salt. The catalyst contains less than about 0.2 moles of the metal salt per mole of DMC compound; i.e., mole fraction Zn/Co<1.6. Disclosed organic complexing agents include alcohols, aldehydes, ketones, ethers, esters, amides, ureas, nitrites, sulfides, and mixtures thereof. With low levels of $ZnCl_2$, these catalysts are very active and produce polyols with very low unsaturation. The metal salt of Le-Khac contains chloride.

Combs, in U.S. Pat. No. 5,952,261, discloses highly active double metal cyanide complex catalysts useful for epoxide polymerization prepared by reacting zinc chloride or other metal salt with potassium hexacyanocobaltate or other metal cyanide salt in the presence of a Group IIA compound such as calcium chloride. The DMC catalyst of Combs '261 is amorphous and contains salts other than hydroxide.

Several patents and applications, in the name of Grosch et al., including U.S. Pat. Nos. 6,303,533, 6,362,126, 6,303, 833, and U.S. Pub. Pat. Appl. Nos. 2003/0013604, 2002/0032121, 2002/0006864 generally disclose double-metal cyanide catalysts of the formula $M^1_a [M^2 (CN)_b (A)_c]d \cdot fM^1_g X_n \cdot h (H_2O) \cdot eL$, where $M^1$ is a metal ion $M^2$ is a metal ion and $M^1$ and $M^2$ are identical or different, A is an anion, X is an anion, L is a water-miscible ligand, a, b, c, d, g and n are selected so as to make the compound electrically neutral, and e denotes the coordination number of the ligand, e and f denote fractions or integers greater than or equal to zero, h denotes a fraction or integer greater than or equal to zero. It appears the metal salt used in making the catalysts disclosed by Grosch must be water-soluble and that metal carboxylates are preferred.

A need exists in the art for a hydroxide containing double metal cyanide (DMC) catalyst and process for production of such a catalyst that does not require use of a water-soluble metal salt. Surprisingly, the crystalline, double metal cyanide hydroxides of the present invention catalyze the polymerization of alkylene oxides whereas the compounds of the art do not.

SUMMARY OF THE INVENTION

The present invention provides a crystalline, hydroxide containing double metal cyanide (DMC) catalyst of the formulae (I) or (II),

$$M^1_x[M^2(CN)_6]_y OH \cdot L \qquad (I)$$

$$M^1_x[M^2(CN)_6]_y \cdot zM^1(OH)_q \cdot L \qquad (II)$$

wherein $M^1$ represents a metal selected from the group consisting of $Zn^{+2}$, $Fe^{+2}$ $Ni^{+2}$ $Mn^{+2}$ $Co^{+2}$ $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$, $M^2$ represents a metal selected from the group consisting of $Fe^{+2}$, $Fe^{+3}$ $Co^{+2}$, $Co^{+3}$, $Cr^{+2}$, $Cr^{+3}$, $Mn^{+2}$ $Mn^{+3}$, $Ir^{+3}$ $Ni^{+2}$ $Rh^{+3}$, $Ru^{+2}$, $V^{+4}$ and $V^{+5}$, L represents an organic ligand, and x, y, and q are chosen to maintain electroneutrality.

Further provided, are processes for production of the crystalline, hydroxide containing DMC catalyst of the present invention and processes for the preparation of polyols, in particular polyether polyols, with the inventive crystalline, hydroxide containing DMC catalyst.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the following figures, wherein.

DETAILED DESCRIPTION OF THE INVENTION

Figure 1:
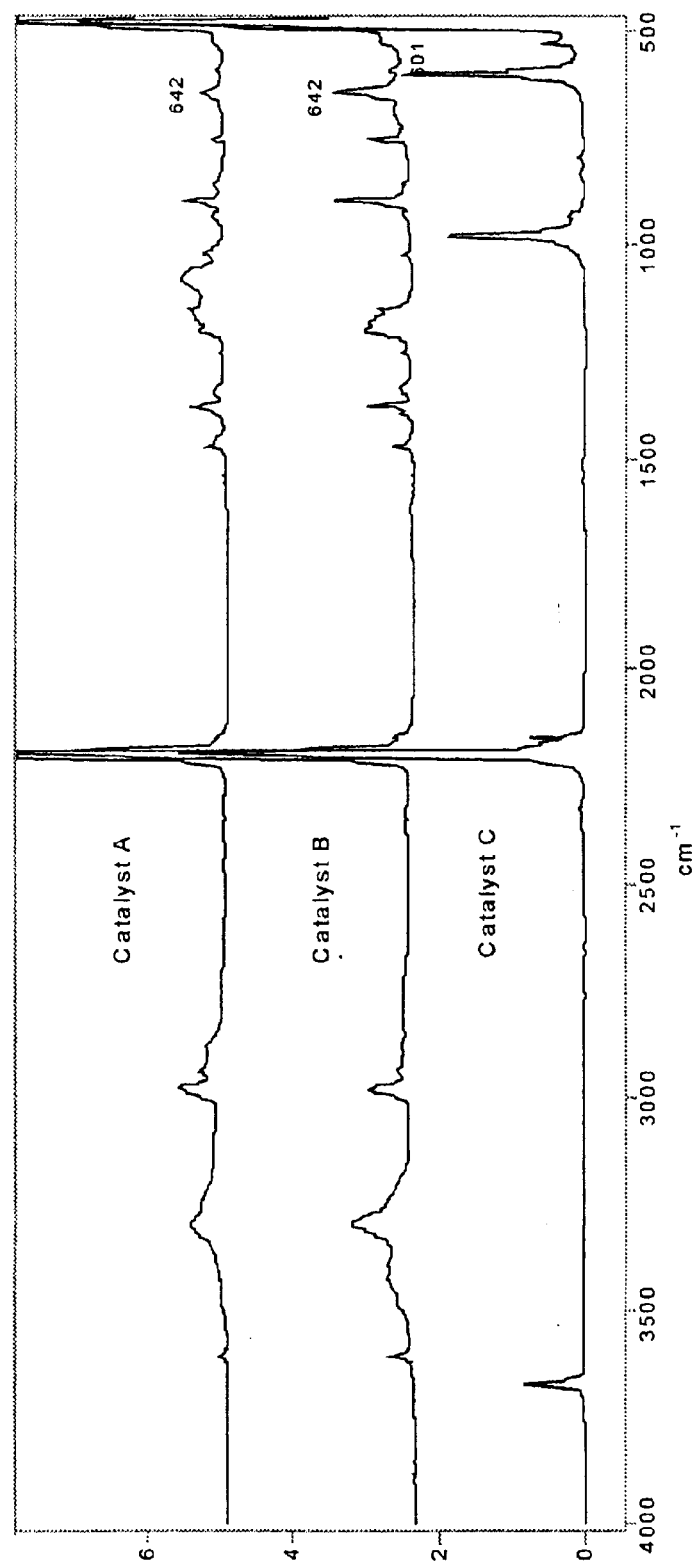
FIG. 1 depicts infrared spectrograms of selected DMC catalysts.

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides a crystalline, hydroxide containing double metal cyanide (DMC) catalyst of the formulae (I) or (II),

$$M^1_x[M^2(CN)_6]_y OH \cdot L \quad (I)$$

$$M^1_x[M^2(CN)_6]_y \cdot zM^1(OH)_q \cdot L \quad (II)$$

$M^1$, in the above formula (I), represents a metal selected from $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$. In the hydroxide containing DMC catalyst of the present invention, $Zn^{+2}$ is particularly preferred as $M^1$.

$M^2$, in the above formula (I), represents a metal selected from $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. In the hydroxide containing DMC catalyst of the present invention, $Co^{-3}$ is particularly preferred as $M^2$.

Preferred organic complex ligands, L in the hydroxide containing DMC catalyst of the present invention, include, but are not limited to, alcohols, aldehydes, ketones, ethers, esters, amides, ureas, nitriles, sulfides and mixtures thereof. More preferred as organic complex ligands are water-soluble aliphatic alcohols such as ethanol, isopropanol, n-butanol, isobutanol, sec-butanol and tert-butanol, with tert-butanol being the most preferred.

In the above formulae (I) and (II), x, y, and q are selected so as to maintain the electroneutrality of the hydroxide containing DMC complex.

The hydroxide containing DMC catalysts of the present invention may be made by the steps of reacting a $M^1$ containing oxide or hydroxide with a $M^2$ containing hexacyanometallate or hexacyanometallic acid in the presence of an organic ligand, L, and water, and collecting the catalyst.

The hydroxide containing DMC catalysts of the present invention may be made by the steps of reacting $M^1$ containing salts of some strong acids (such as sulfuric, sulfonic or nitrous acid) with a $M^2$ containing hexacyanometallate or hexacyanometallic acid in the presence of an organic ligand, L, and water; and collecting the catalyst.

The hydroxide containing DMC catalysts of the present invention may be made by the steps of reacting a $M^1$ containing oxide or hydroxide and a $M^1$ containing salt with a $M^2$ containing hexacyanometallate or hexacyanometallic acid in the presence of an organic ligand, L, and water; and collecting the catalyst. The $M^1$ containing salt preferably contains an anion selected from halides, sulfates, carbonates, cyanides, oxalates, thiocyanates, isocyanates, isothiocyanates, carboxylates and nitrates.

Alternatively, the hydroxide containing DMC catalysts of the present invention may be made by the steps of mixing a $M^1$ containing salt, a strongly basic compound (such as alkali metal hydroxides, alkaline earth metal hydroxides, or amines) with a $M^2$ containing hexacyanometallate or hexacyanometallic acid in the presence of an organic ligand, L, and water; and collecting the catalyst. The $M^1$ containing salt preferably contains an anion selected from halides, sulfates, carbonates, cyanides, oxalates, thiocyanates, isocyanates, isothiocyanates, carboxylates and nitrates.

The metal containing oxide or hydroxide used in making the hydroxide containing DMC catalyst of the present invention may have a water solubility ranging from low to almost water-insoluble. A preferred metal containing oxide is zinc oxide or zinc hydroxide.

The present invention is further illustrated, but is not to be limited, by the following examples.

EXAMPLES

Examples 1–7

A solution containing 0.54 moles of ligand (as noted in Table I below) and 275 g of distilled water was prepared in a four-neck, one-liter flask equipped with a stirrer, thermocouple, and heating mantle. To this solution was added 18.0 g (0.132 moles) of zinc chloride followed by 3.30 g (0.033 moles) of zinc hydroxide. The slurry was heated to 50° C. with vigorous stirring. A syringe pump was used to add slowly 141 g of 2.55% hexacyanocobaltic acid ($H_3Co(CN)_6$, 0.0165 moles) to the mixture. After the acid addition was completed, the mixture was heated and stirred for an additional 45 minutes. To this slurry was added 5 g of 1 k diol and stirring was continued for two more minutes. The solid was collected using a low-pressure stainless steel filtration unit. The wet cake was resuspended in 250 g of ligand and stirred at 50° C. for 60 minutes. To this slurry was added 5 g of 1 k diol and stirring was continued for two more minutes. The solid was collected by pressure filtration and dried overnight in a vacuum oven at 55° C. –60° C. The catalysts prepared in the above examples are summarized in Table I where TBA refers to tert-butanol; IPA is isopropanol; PG is propylene glycol and PPG-425 is a 425 MW polypropylene glycol available from Bayer Polymers LLC.

TABLE I

| Example No. | Ligand | OH Peak FT-IR |
|---|---|---|
| Comp. 1 | water | None |
| 2 | TBA | 641 |
| 3 | IPA | 608 |
| 4 | methyl ether PG | 629 |
| 5 | methyl ether PG | 627 |
| 6 | PPG 425 | None |
| 7 | 1-propanol | None |

As can be appreciated by reference to Table I, catalysts 2–5 have a peak between 600 and 650 cm$^{-1}$. By reference to the infrared spectrograms shown in FIG. 1, Catalyst A (made according to U.S. Pat. No. 5,482,908) and Catalyst B (made according to U.S. Pat. No. 5,783,513) exhibited this characteristic peak in the region around 642 cm$^{-1}$.

Typical peaks for OH rocking motions are found in the region between 500 and 700 cm$^{-1}$ (I. Gennick and K. M.

Harmon, *Inorganic Chemistry*, 14(9), 2214, 1975). Catalyst C, in FIG. 1 (made according to van der Hulst et al., U.S. Pat. No. 4,477,589), had OH peaks at 3673 and 590–600 cm$^{-1}$ (J. Kuyper and G. Boxhoorn, *Journal of Catalysis*, 105, 163, 1987).

Examples 8–15

A solution containing 0.81 moles of ligand (as noted in Table II below), 0.23 moles of zinc salt (anion as noted in Table II below), zinc oxide, and 200 g of distilled water was prepared in a four-neck, one-liter flask equipped with a stirrer, thermocouple, and heating mantle. The solution was heated to 65° C. with vigorous stirring. A syringe pump was used to add 266.3 g of 6.12% potassium hexacyanocobaltate (K$_3$Co(CN)$_6$, 0.049 moles) to the mixture at 2.8 ml/min. After the addition was complete, the mixture was heated and stirred for an additional 45 minutes. To this slurry was added 5 g of 1 k diol and the slurry was stirred for two more minutes. The solid was collected using a low-pressure stainless steel filtration unit. The wet cake was resuspended in 400 g of 90110 wt/wt ligand/water solution and stirred at 65° C. for 60 minutes. To this slurry was added 5 g of 1 k diol and the slurry was stirred for two more minutes. A second filtration was performed to collect the solid, which was dried overnight in a vacuum oven at 55° C.–60° C.

Table II summarizes the catalysts made in the above-detailed examples.

TABLE II

| Ex. No. | Anion | Ligand | ZnO Added | OH Peak cm$^{-1}$ (Intensity) |
|---|---|---|---|---|
| 8 | sulfate | TBA | No | 640 (0.85) |
| 9 | sulfate | IPA | No | 607 (0.31) |
| 10 | chloride | TBA | No | 643 (0.06) |
| 11 | sulfonate | TBA | No | 641 (0.53) |
| 12 | sulfonate | TBA | Yes | 641 (1.33) |
| 13 | sulfonate | TBA | Yes | 641 (1.10) |
| 14 | chloride | TBA | Yes | 640 (1.68) |
| 15 | chloride | glyme | Yes | 612 (1.27) |

Addition of zinc oxide where sulfonates was used in Examples 12 and 13 increases the intensity of the OH peaks in the resultant catalyst over that of Example 11, a sulfonate where no zinc oxide was added.

Figure 2:
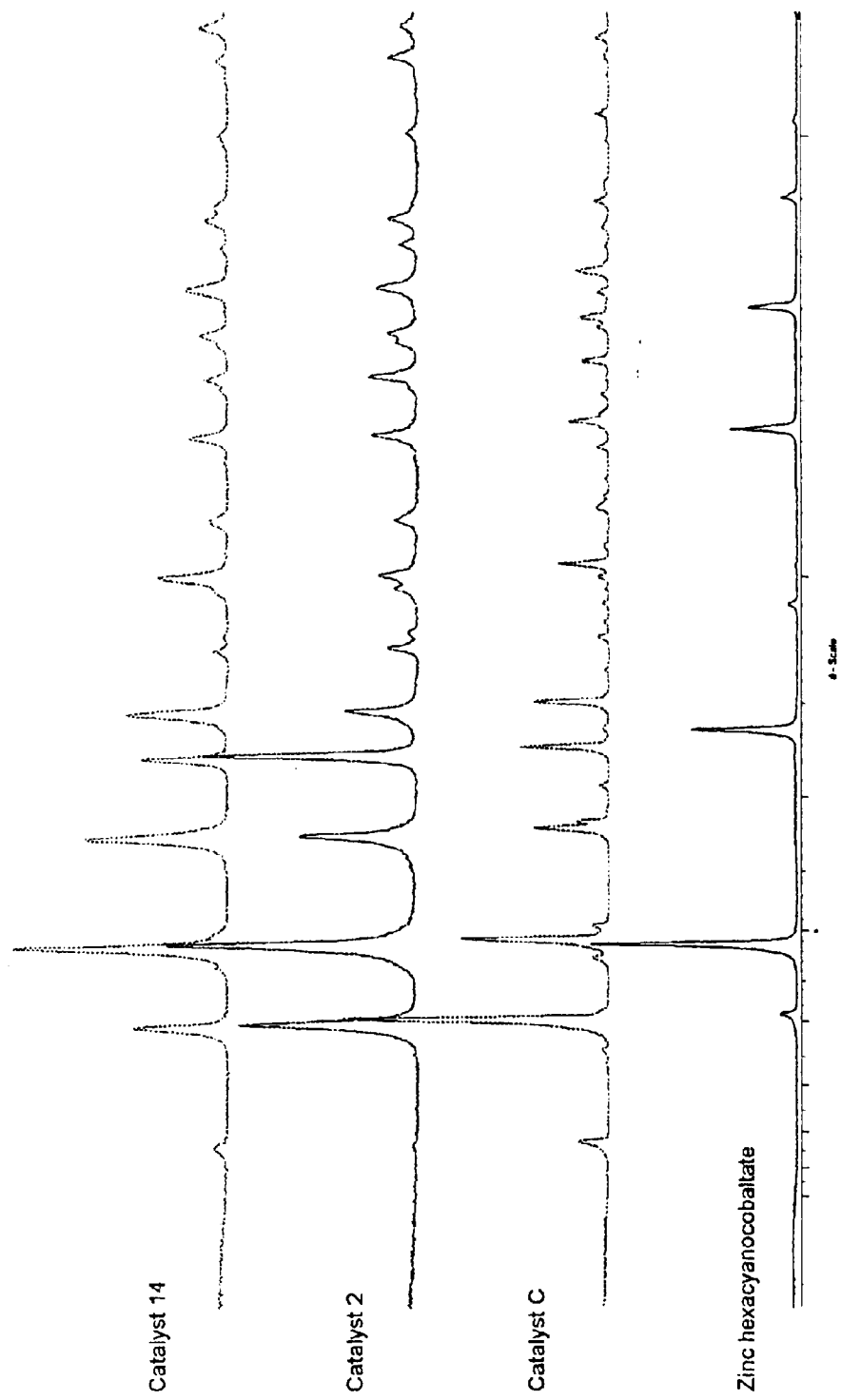
FIG. 2 shows X-ray diffraction patterns of selected DMC catalysts.

Referencing FIG. 2, five characteristic peaks are found in the crystalline x-ray diffraction pattern of zinc hexacyanocobaltate hydroxide between 12 and 26 2θ. The respective diffraction patterns for the catalyst produced in Example 14, Example 2, Catalyst C from FIG. 1 and zinc hexacyanocobaltate, are shown. Both of the inventive catalysts and Catalyst C showed all five of the peaks.

Example 16

2.0 g of 99.9% zinc oxide was dispersed in a solution of 686 g of t-butyl alcohol (TBA) and 54 g of deionized water in a one-liter flask equipped with a stirrer and heating mantle. The slurry was heated to 55° C. before adding 39.5 g of an aqueous hexacyanocobaltic acid solution (0.17% cobalt) with a syringe pump over a 30 minute period. After all the acid had been added, the slurry was mixed for 2 hours at 55° C. The mixture was filtered and the solid resuspended in 400 g of TBA and heated at 55° C. for 70 minutes. The slurry was filtered to collect the solids that were dried in a vacuum oven overnight at 45° C.

The IR spectrum of this catalyst resembles that of Catalyst A, shown in FIG. 1, and contained the characteristic peak at about 642 cm$^{-1}$. Catalyst activity was assessed by making a 6k trio with a four hour feed at 126 ppm catalyst concentration as described below.

Catalyst Activity

Several of the catalysts made herein were evaluated for propoxylation activity at 25 ppm by preparing a 6k triol from a glycerine-based PO, block polyol having an OH number of 238 and a functionality of about 3. A reactor equipped with two six-inch pitched blade turbines, a Rushton turbine at the bottom of the impeller shaft and baffles was used to prepare the polyol. Rates are calculated by monitoring drops in PO partial pressures from the moment oxide addition is completed. To reduce or eliminate mass transfer limitations between the liquid and vapor phases, the batch size is set such that the last blade is half covered to encourage maximum interfacial mixing.

Calculated apparent rate constants (k$_{app}$) are used to calculate the relative rates shown in Table III below. These values were determined by plotting the natural logarithm of PO partial pressure versus time and determining the slope of the resultant straight line.

Table III summarizes the evaluations of several of the catalysts of the present invention. The control polyol was made with a catalyst according to Ex. 13 of U.S. Pat. No. 5,712,216. "Catalyst No." refers to the example number herein where the tested catalyst was prepared. As is apparent by reference to Table III, the inventive catalysts produced polyols with comparable amounts of unsaturation as those produced using the catalysts of U.S. Pat. No. 5,712,216.

TABLE III

| Catalyst No. | Ligand | Relative rate* | OH # | Unsat'n | Viscosity (cPs) |
|---|---|---|---|---|---|
| Control | TBA | 1 | 29 | 0.005 | 1217 |
| 2 | TBA | 0.54 | 28.6 | 0.002 | 2694 |
| 2‡ | TBA | 0.43 | 28.7 | 0.003 | 1858 |
| 3 | IPA | 0.18 | 28.7 | 0.008 | 16082 |

*Rates normalized to 3 ppm cobalt in polyol.
‡Catalyst 2 at double the concentration.

The foregoing descriptions of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A hydroxide containing double metal cyanide (DMC) catalyst of the formulae (I) or (II),

wherein

M$^1$ represents a metal selected from the group consisting of Zn$^{+2}$, Fe$^{+2}$, Ni$^{+2}$, Mn$^{+2}$, Co$^{+2}$, Sn$^{+2}$, Pb$^{+2}$, Fe$^{+3}$, Mo$^{+4}$, Mo$^{+6}$, Al$^{+3}$, V$^{+4}$, V$^{+5}$, Sr$^{+2}$, W$^{+4}$, W$^{+6}$, Cu$^{+2}$ and Cr$^{+3}$, M$^2$ represents a metal selected from the group consisting of Fe$^{+2}$, Fe$^{+3}$, Co$^{+2}$, Co$^{+3}$, Cr$^{+2}$, Cr$^{+3}$, Mn$^{+2}$, Mn$^{+3}$, Ir$^{+3}$, Ni$^{+2}$, Rh$^{+3}$, Ru$^{+2}$, V$^{+4}$ and V$^{+5}$, L represents an organic ligand, x, y, and q are chosen to maintain electroneutrality, and wherein the catalyst is crystalline.

2. The hydroxide containing double metal cyanide (DMC) catalyst according to claim 1, wherein the organic ligand, L, is selected from the group consisting of alcohols, polyols, polyether polyols, aldehydes, ketones, ethers, esters, amides, ureas, nitriles, sulfides and mixtures thereof.

3. The hydroxide containing double metal cyanide (DMC) catalyst according to claim 1, wherein the organic ligand, L, is selected from the group consisting of ethanol, isopropanol, n-butanol, isobutanol, sec-butanol and tert-butanol.

4. The hydroxide containing double metal cyanide (DMC) catalyst according to claim 1, wherein the organic ligand, L, is tert-butanol.

5. The hydroxide containing double metal cyanide (DMC) catalyst according to claim 1, wherein M represents $Zn^{+2}$ and $M^{+2}$ represents $Co^{+3}$.

6. A process of making a hydroxide containing double metal cyanide (DMC) catalyst of the formulae (I) or (II), $$M^1_x[M^2(CN)_6]_y OH \cdot L \qquad (I)$$

$$M^1_x[M^2(CN)_6]_y \cdot zM^1(OH)_q \cdot L \qquad (II)$$

said process comprising the steps of:
reacting a $M^1$ containing oxide with a $M^2$ containing hexacyanometallate or hexacyanometallic acid in the presence of an organic ligand, L, and water; and
collecting the crystalline catalyst,
wherein
$M^1$ represents a metal selected from the group consisting of $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$,
$M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$,
L represents an organic ligand, and
X, y and q are chosen to maintain electroneutrality.

7. The process according to claim 6, wherein the organic ligand, L, is selected from the group consisting of alcohols, polyols, polyether polyols, aldehydes, ketones, ethers, esters, amides, ureas, nitriles, sulfides and mixtures thereof.

8. The process according to claim 6, wherein the organic ligand, L, is selected from the group consisting of ethanol, isopropanol, n-butanol, isobutanol, sec-butanol and tert-butanol.

9. The process according to claim 6, wherein the organic ligand, L, is tert-butanol.

10. The process according to claim 6, wherein $M^1$ represents $Zn^{+2}$ and $M^2$ represents $Co^{+3}$.

11. A hydroxide containing double metal cyanide (DMC) catalyst of the formulae (I) or (II), $$M^1_x[M^2(CN)_6]_y OH \cdot L \qquad (I)$$

$$M^1_x[M^2(CN)_6]_y \cdot zM^1(OH)_q \cdot L \qquad (II)$$

made by:
reacting a $M^1$ containing oxide with a $M^2$ containing hexacyanometallate or hexacyanometallic acid in the presence of an organic ligand, L, and water; and
collecting the crystalline catalyst,
wherein
$M^1$ represents a metal selected from the group consisting of $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$,
$M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$, L represents an organic ligand, and
X, y and q are chosen to maintain electroneutrality.

12. A process of making a hydroxide containing double metal cyanide (DMC) catalyst of the formulae (I) or (II), $$M^1_x[M^2(CN)_6]_y OH \cdot L \qquad (I)$$

$$M^1_x[M^2(CN)_6]_y \cdot zM^1(OH)_q \cdot L \qquad (II)$$

said process comprising the steps of:
reacting a $M^1$ containing salt of a strong acid with a $M^2$ containing hexacyanometallate or hexacyanometallic acid in the presence of an organic ligand, L, and water; and
collecting the crystalline catalyst
wherein
$M^1$ represents a metal selected from the group consisting of $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$,
$M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$,
L represents an organic ligand, and
X, y and q are chosen to maintain electroneutrality.

13. The process according to claim 12, wherein the organic ligand, L, is selected from the group consisting of alcohols, polyols, polyether polyols, aldehydes, ketones, ethers, esters, amides, ureas, nitriles, sulfides and mixtures thereof.

14. The process according to claim 12, wherein the organic ligand, L, is selected from the group consisting of ethanol, isopropanol, n-butanol, isobutanol, sec-butanol and tert-butanol.

15. The process according to claim 12, wherein the organic ligand, L, is tert-butanol.

16. The process according to claim 12, wherein $M^1$ represents $Zn^{+2}$ and $M^2$ represents $Co^{+3}$.

17. The process according to claim 12, wherein the strong acid is selected from sulfuric, sulfonic and nitrous acid.

18. A hydroxide containing double metal cyanide (DMC) catalyst of the formulae (I) or (II), $$M^1_x[M^2(CN)_6]_y OH \cdot L \qquad (I)$$

$$M^1_x[M^2(CN)_6]_y \cdot zM^1(OH)_q \cdot L \qquad (II)$$

made by:
reacting a $M^1$ containing salt of a strong acid with a $M^2$ containing hexacyanometallate or hexacyanometallic acid in the presence of an organic ligand, L, and water; and
collecting the crystalline catalyst wherein
$M^1$ represents a metal selected from the group consisting of $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$,
$M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$,
L represents an organic ligand, and X, y and q are chosen to maintain electroneutrality.

19. A process of making a hydroxide containing double metal cyanide (DMC) catalyst of the formulae (I) or (11), $$M^1_x[M^2(CN)_6]_y OH \cdot L \qquad (I)$$

$$M^1_x[M^2(CN)_6]_y \cdot zM^1(OH)_q \cdot L \qquad (II)$$

said process comprising the steps of:
  reacting a $M^1$ containing oxide with a $M^2$ containing hexacyanometallate or hexacyanometallic acid in the presence of an organic ligand, L, and water; and
  collecting the crystalline catalyst,
  wherein
  $M^1$ represents a metal selected from the group consisting of $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$,
  $M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$,
  L represents an organic ligand, and
  x, y and q are chosen to maintain electroneutrality.

20. The process according to claim 19, wherein the organic ligand, L, is selected from the group consisting of alcohols, polyols, polyethers, aldehydes, ketones, ethers, esters, amides, ureas, nitriles, sulfides and mixtures thereof.

21. The process according to claim 19, wherein the organic ligand, L, is selected from the group consisting of ethanol, isopropanol, n-butanol, isobutanol, sec-butanol and tert-butanol.

22. The process according to claim 19, wherein the organic ligand, L, is tert-butanol.

23. The process according to claim 19, wherein M1 represents $Zn^{+2}$ and $M^2$ represents $Co^{+3}$.

24. The process according to claim 19, wherein the $M^1$ containing salt contains an anion selected from halides, sulfates, carbonates, cyanides, oxalates, thiocyanates, isocyanates, isothiocyanates, carboxylates and nitrates.

25. A hydroxide containing double metal cyanide (DMC) catalyst of the formulae (I) or (II),

  (I)

  (II)

made by:
  reacting a $M^1$ containing oxide with a $M^2$ containing hexacyanometallate or hexacyanometallic acid in the presence of an organic ligand, L, and water; and
  collecting the crystalline catalyst,
  wherein
  $M^1$ represents a metal selected from the group consisting of $Zn^{+2}$, $Fe^{+2}$, $Ni^{+2}$, $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$,
  $M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$,
  L represents an organic ligand, and
  x, y and q are chosen to maintain electroneutrality.

26. A process of making a hydroxide containing double metal cyanide (DMC) catalyst of the formulae (I) or (II),

  (I)

  (II)

said process comprising the steps of:
  mixing a $M^1$ containing salt, a strongly basic compound with a $M^2$ containing hexacyanometallate or hexacyanometallic acid in the presence of an organic ligand, L, and water; and
  collecting the catalyst
  wherein
  $M^1$ represents a metal selected from the group consisting of $Zn^{+2}$, $Fe^{+2}$, $Ni^{+2}$ $Mn^{+2}$, $Co^{+2}$, $Sn^{+2}$, $Pb^{+2}$, $Fe^{+3}$, $Mo^{+4}$, $Mo^{+6}$, $Al^{+3}$, $V^{+4}$, $V^{+5}$, $Sr^{+2}$, $W^{+4}$, $W^{+6}$, $Cu^{+2}$ and $Cr^{+3}$,
  $M^2$ represents a metal selected from the group consisting of $Fe^{+2}$, $Fe^{+3}$, $Co^{+2}$, $Co^{+3}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$,
  L represents an organic ligand, and
  x, y and q are chosen to maintain electroneutrality.

27. The process according to claim 26, wherein the strongly basic compound is selected from the group consisting of alkali metal hydroxides, alkaline earth metal hydroxides and amines.

28. The process according to claim 26, wherein the organic ligand, L, is selected from the group consisting of alcohols, polyols, polyethers, aldehydes, ketones, ethers, esters, amides, ureas, nitriles, sulfides and mixtures thereof.

29. The process according to claim 26, wherein the organic ligand, L, is selected from the group consisting of ethanol, isopropanol, n-butanol, isobutanol, sec-butanol and tert-butanol.

30. The process according to claim 26, wherein the organic ligand, L, is tert-butanol.

31. The process according to claim 26, wherein $M^1$ represents $Zn^{+2}$ and $M^2$ represents $Co^{+3}$.

32. The process according to claim 26, wherein the $M^1$ containing salt contains an anion selected from halides, sulfates, carbonates, cyanides, oxalates, thiocyanates, isocyanates, isothiocyanates, carboxylates and nitrates.

* * * * *

UNITED STATES PATENT AND TRADEMARK OFFICE
CERTIFICATE OF CORRECTION

PATENT NO. : 6,855,658 B1
DATED : February 15, 2005
INVENTOR(S) : George Combs

It is certified that error appears in the above-identified patent and that said Letters Patent is hereby corrected as shown below:

Column 5,
Line 21, delete "90110" and insert -- 90/10 --.

Column 9,
Line 2, after "reacting a $M^1$ containing oxide", insert -- and a M' containing salt --.

Signed and Sealed this

Sixteenth Day of August, 2005

JON W. DUDAS
*Director of the United States Patent and Trademark Office*